Sept. 29, 1959  D. A. DOTSON ET AL  2,906,187
AUTOMATIC CAMERA CONTROL
Filed Jan. 7, 1954  4 Sheets-Sheet 1

DONALD A. DOTSON,
ROBERT KIMES,
INVENTORS.

BY

AGENT.

Sept. 29, 1959  D. A. DOTSON ET AL  2,906,187
AUTOMATIC CAMERA CONTROL

Filed Jan. 7, 1954  4 Sheets-Sheet 2

DONALD A. DOTSON,
ROBERT KIMES,
INVENTOR.

BY *Donald L. Royer*

AGENT.

Sept. 29, 1959    D. A. DOTSON ET AL    2,906,187
AUTOMATIC CAMERA CONTROL
Filed Jan. 7, 1954    4 Sheets-Sheet 3
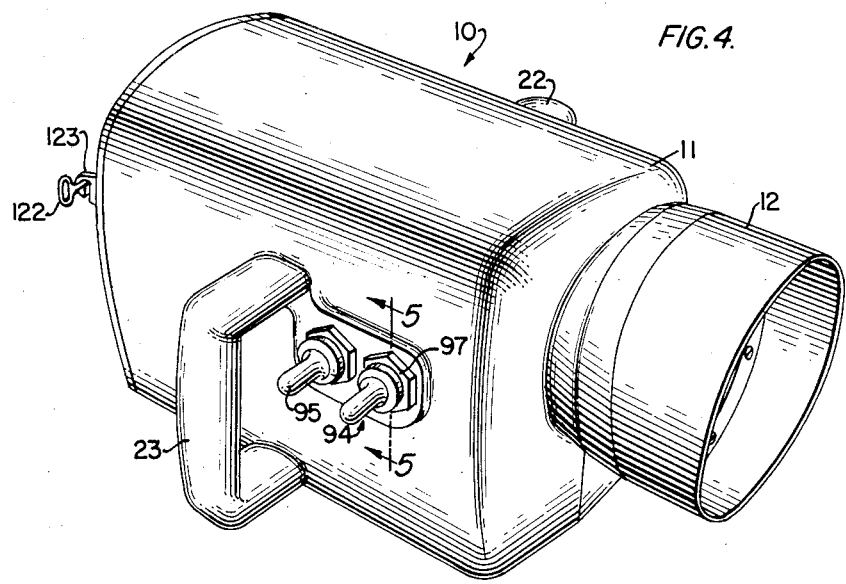
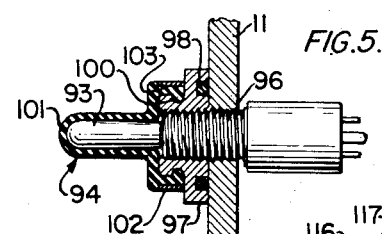
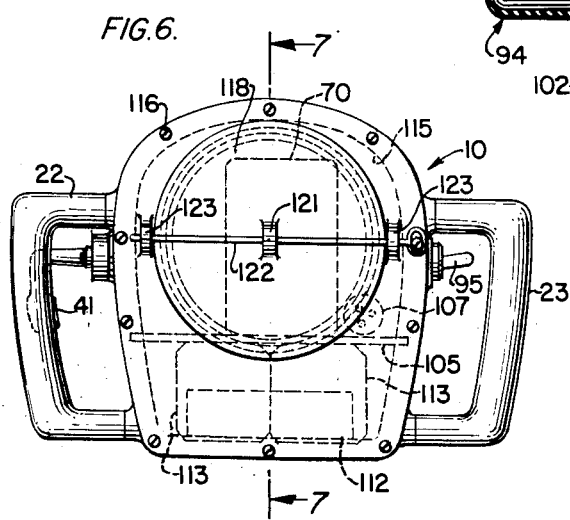
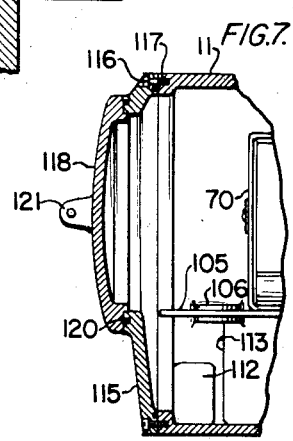
DONALD A. DOTSON,
ROBERT KIMES,
INVENTORS.
BY
AGENT.

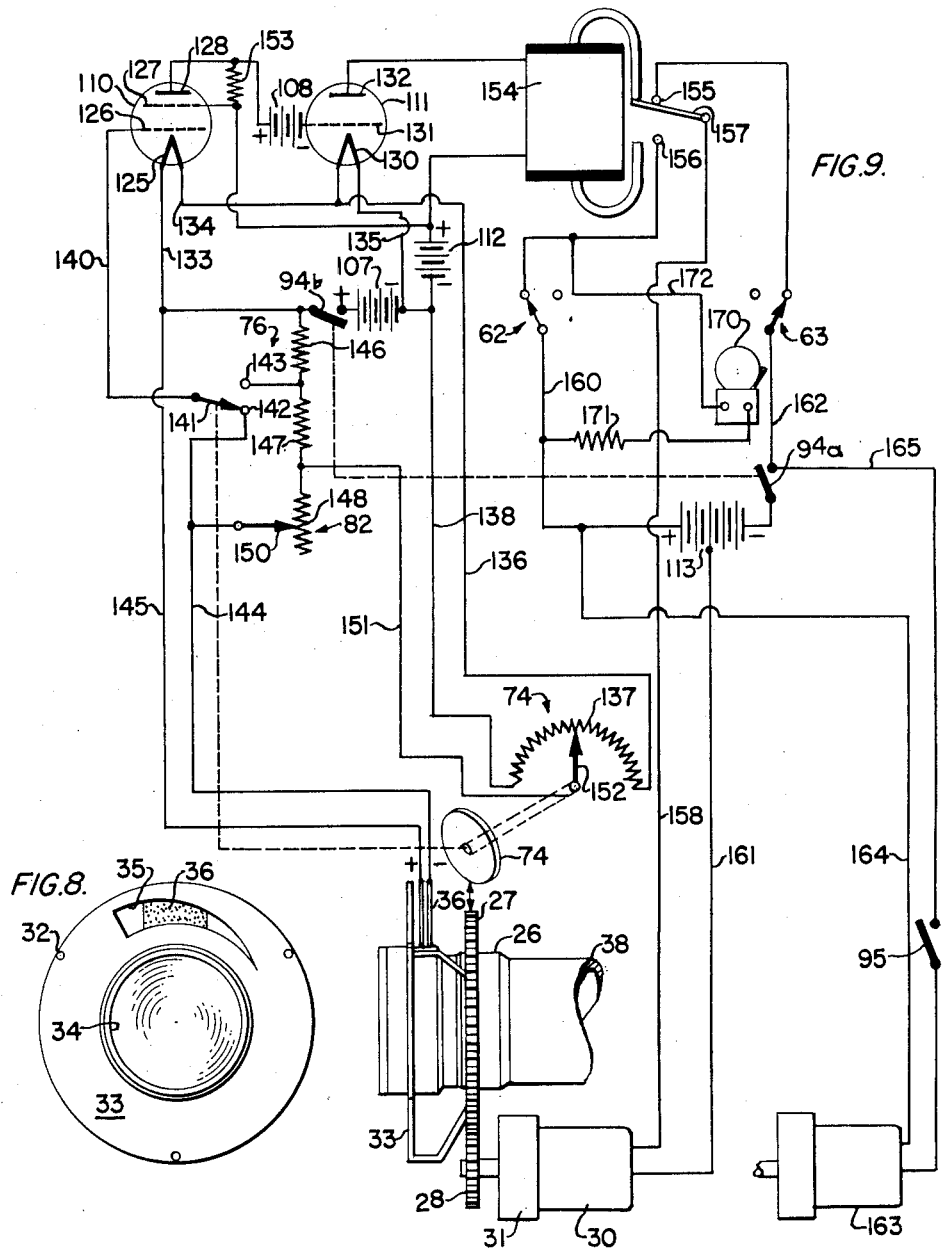
DONALD A. DOTSON,
ROBERT KIMES,
INVENTOR.

United States Patent Office 2,906,187
Patented Sept. 29, 1959

2,906,187

AUTOMATIC CAMERA CONTROL

Donald A. Dotson, Los Angeles, and Robert Kimes, Culver, Calif., assignors to Dotson-Kimes Enterprises, Culver City, Calif., a partnership Application January 7, 1954, Serial No. 402,624

9 Claims. (Cl. 95—64)

This invention relates generally to cameras, and particularly relates to electronic means for automatically controlling the lens aperture of a photographic camera in response to the brightness of a scene to be photographed.

The camera of the present invention is particularly adapted for use as an underwater camera for taking motion pictures, and the invention will be described, by way of example, in connection with such use. It is to be understood, however, that the invention may also be applied to conventional cameras, either of the still or the motion picture type, suitable for taking photographs in air and which, therefore, need not be water-tight.

Many cameras, as proposed in the past, have had mechanical devices for automatically, or semi-automatically, adjusting the aperture of the camera lens, by means of an iris mechanism, in accordance with the amount of light falling on a scene to be photographed. Furthermore, electric circuits have been devised to this end. Conventionally, the light reflected on a scene or object to be photographed is measured by a photoelectric cell which usually is of the photovoltaic type. Hence, the photo cell develops a current or voltage representative of the amount of such light falling thereon. Unfortunately, the amount of electric power obtainable from such a cell is generally insufficient to directly adjust the iris mechanism of the camera. Consequently an amplifier must be used for such controlling of the iris mechanism in accordance with the amount of such light, as measured by the photoelectric cell. Amplifiers proposed in the past for this purpose have been of the alternating-current type, and therefore, the direct voltage obtained from the photo cell, and from portable batteries, must be interrupted by a vibrator or chopper which greatly adds to the weight of the equipment and hence makes it almost impossible to design a truly portable camera which includes a source of electric power and an A.C. amplifier chain. Since direct current (D.C.) amplifiers are well known, it would appear to be a logical choice to utilize such a D.C. amplifier which does not require a chopper. However, it is also well known that D.C. amplifiers are inherently unstable and furthermore, their gain and other characteristics vary with age and greatly depend on the voltages applied to the amplifier. Consequently, D.C. amplifiers have not previously been suggested for use in connection with the automatic control of the lens aperture of a camera, nor, for the above reasons, have such D.C. amplifiers been feasible in the past.

It is, accordingly, an object of the present invention to provide an improved automatic control for the lens aperture of a camera which utilizes D.C. amplifiers with a resultant savings in space and weight.

A further object of the invention is to provide an improved underwater motion picture camera having novel means for automatically adjusting the lens aperture and for adjusting the focus of the camera lens.

Another object of the invention is to provide an improved underwater camera which is water-tight and permits actuation of various adjustments and controls from the outside thereof.

A still further object of the invention is to provide a novel electronic circuit for periodically adjusting the gain or the grid voltage of a D.C. amplifier forming a portion of an electro-mechanical follow-up system.

In accordance with the present invention, a photo cell is associated with a camera and has a resistance that is proportional to the brightness of a scene to be photographed. This cell has associated therewith separate apparatus for adjusting the aperture thereof, and preferably such apparatus may comprise a rotatable disc having a wedge-shape aperture to control the amount of light reflected from the scene that is permitted to fall on the cell. An electric motor controls, in unison, the iris of the camera lens and the aperture of the cell in response to variations in the resistance of the cell. This is accomplished by means of a D.C. amplifier. Further in accordance with the present invention, the grid bias voltage of the amplifier may be selectively adjusted by means of the electric motor, while the cell is effectively disconnected from the amplifier control grid. Hence, the electric circuit may be periodically readjusted to take care of variations of the amplifier tube characteristics and of their voltage supplies, such adjustment being effected automatically. This adjustment or "standardizing" of the D.C. amplifier makes possible the use of such D.C. amplifier without rendering the electric circuit unstable or subject to frequent and often difficult manual adjustments.

These and other objects of the present invention will become more apparent as the description proceeds, taken in connection with the accompanying drawings, wherein:

Fig. 4 is a side elevational view of the camera of Fig. 1;

Fig. 5 is a sectional view taken substantially on line 5—5, Fig. 4, and illustrating the construction of one of the external control toggle switches thereof;

Fig. 6 is a rear elevational view of the camera;

Fig. 7 is a sectional view taken substantially on line 7—7, Fig. 6;

Fig. 8 is a front elevational view of the lens aperture adjusting disc for the photo cell; and Fig. 9 is a schematic circuit diagram illustrating the electronic control of the lens aperture.

Figure 1:
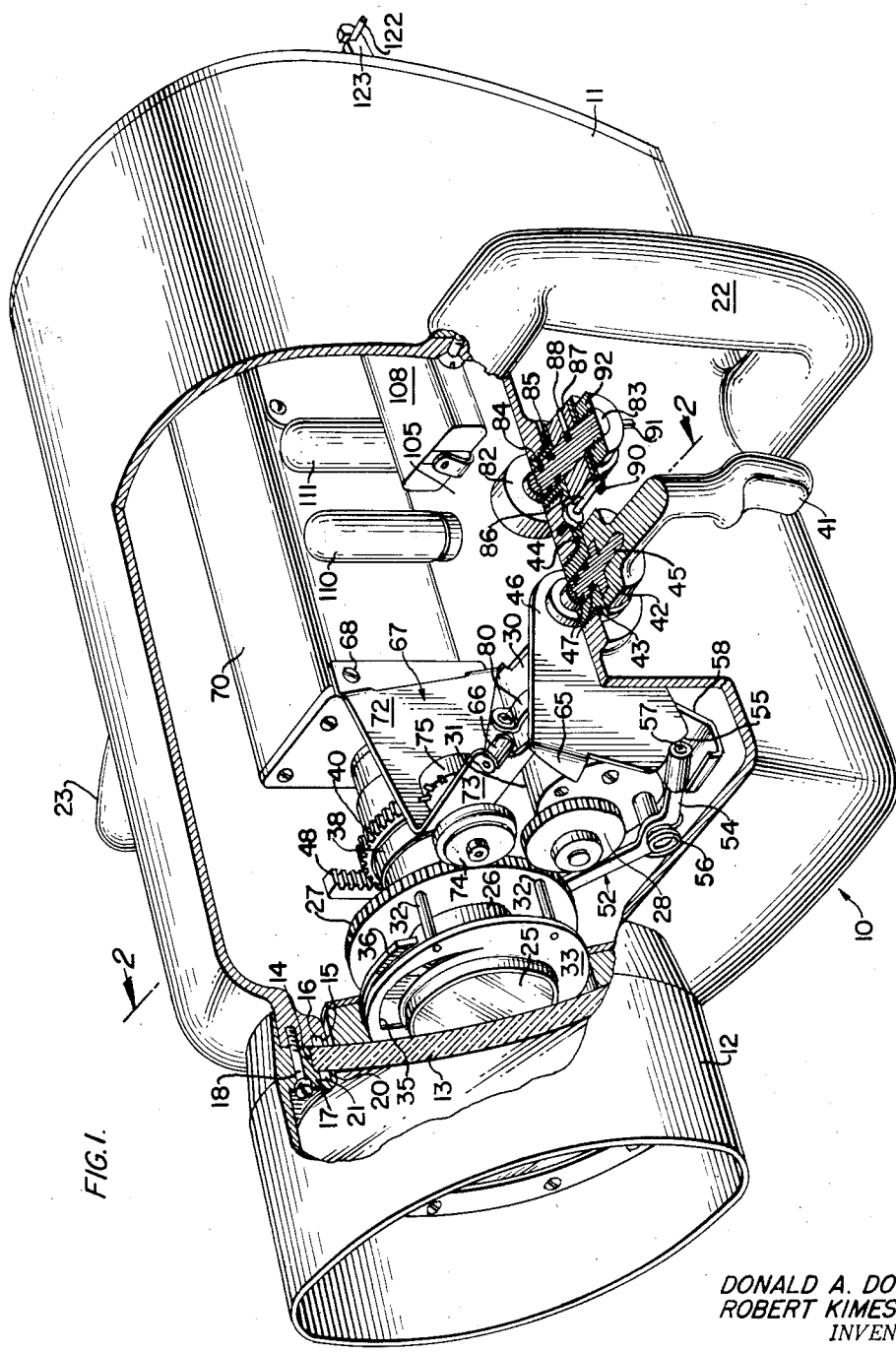
Fig. 1 is a perspective view of the underwater camera of the present invention with parts being broken away.
Figure 2:
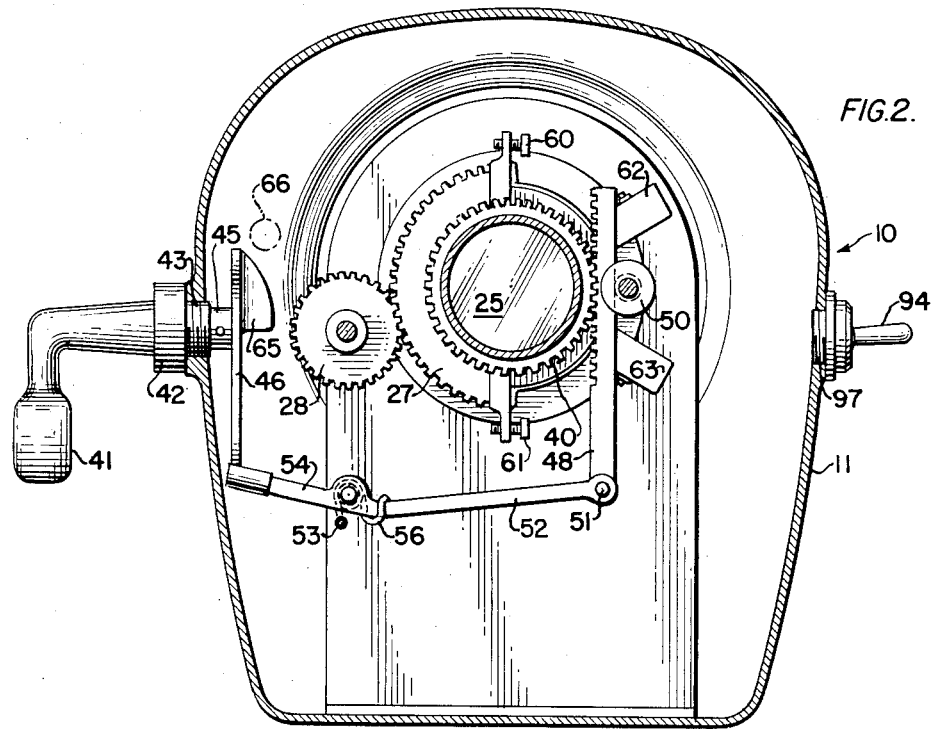
Fig. 2 is a sectional view taken substantially on line 2—2, Fig. 1, and illustrating the focus lens aperture control mechanisms of the camera.
Figure 3:
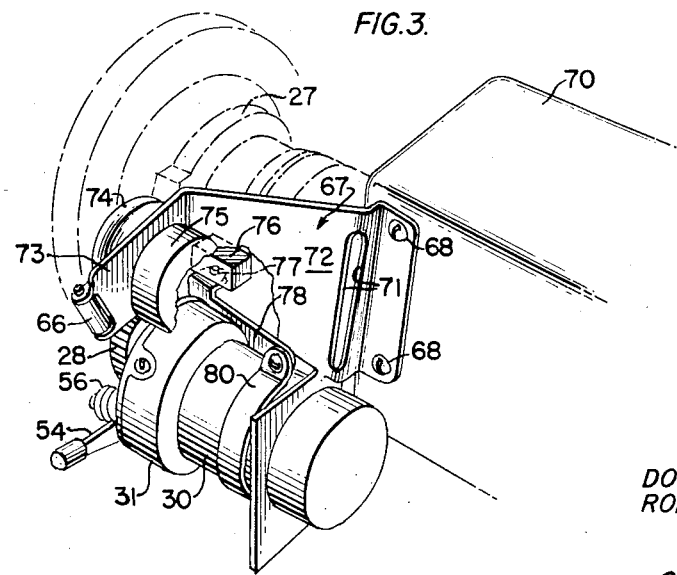
Fig. 3 is a perspective view illustrating particularly the mechanism for selectively initiating the adjustment or standardizing of the amplifier for controlling the lens aperture.

Referring now to the drawings, wherein like parts are designated by the same reference characters, and particularly to Figs. 1 to 3, there is illustrated an underwater motion picture camera generally indicated at 10. The camera 10 includes a water-tight housing 11 which may be provided with a lens shade 12, as is conventional, for preventing stray light from striking the camera lens. The front end of the housing 11 has a transparent port 13, which may be of glass of sufficient thickness to withstand hydrostatic pressure which exists at various depths within the range of use of the present camera. The transparent port 13 bears against the flat outer face 14 of the housing 11, the housing having an annular groove 15 in which a resilient O-ring sealing member 16 or the like is positioned. The port 13 is retained against the face 14 by a ring 17 which is secured by screws 18 to the housing, and which has an annular groove 20 provided with another O-ring sealing member 21. Thus, the two O-rings 16 and 21 will seal the port water-tight against the housing. The lens shade 12 may form part of the ring 17 and part of the front end of the housing. The housing 11 is further provided with two handles 22 and 23 (see particularly Fig. 6) which may be screwed to the housing as shown in Fig. 1 and which facilitate holding of the camera by the two hands of the user.

The camera proper includes a lens or lens system 25 provided with a conventional iris mechanism (not shown) for adjusting the lens aperture. The iris mechanism has the usual adjustment barrel 26 provided with a ring or segment gear 27 which meshes with a drive pinion gear 28. The pinion gear 28 may be rotated in either direction by an electric motor 30 through a gear box 31. The segment gear 27 is connected by means of rods 32 with a disc 33, said disc being disposed about the lens 25. The disc 33 (see particularly Fig. 8) is provided with a central aperture 34 for permitting light to enter the camera lens 25, this disc being provided with an annular axially facing wedge-shape aperture 35 having a relatively wide opening at one end and tapering to a point at the other end. A photoelectric cell 36, having a resistance which is proportional to the light intensity, is fixedly disposed behind the aperture 35 of the disc 33. Hence, by rotating the disc 33 in unison with the segment gear 27, the relative position of the aperture 35 may be adjusted with respect to the cell to control the amount of light permitted to enter the cell.

The lens system of the camera further includes a conventional focusing barrel 38 having a ring gear 40 which is adjustable from the outside of housing 11. Rotation of the focusing barrel 38 causes longitudinal movement of the lens to adjust the lens focus in well-known manner. To this end, there is provided a rotatable finger engageable focus lever 41 disposed adjacent the fixed camera handle 22. The focus lever 41 has an annular head portion 42 which bears against a combined locknut and bushing 43 screwed into the housing 11 and sealed thereto by a gasket or O-ring 44 which is disposed in a suitable recess in the locknut 43. A shaft 45 is rigidly secured to the focus lever 41, extends through locknut 43 and bears a plate-like lever 46 at its free end and in the interior of the housing 11. Shaft 45 is sealed by means of two O-rings 47 disposed in circular grooves in the shaft. Hence, the lever 41 is able to rotate freely with a water-tight seal between the shaft and the housing.

Rotation of the finger lever 41 in a counterclockwise direction, as viewed in Fig. 1, will cause rotation of the lens focusing ring gear 40. The ring gear 40 is actuated by a rack 48 which is guided by a guide roller 50, the roller 50 being mounted on a fixed shaft. One end of rack 48 is pivoted as at 51 to one end of a lever 52 which is pivoted in turn as at 53 to a fixed pivot. The free end 54 of the lever 52 may engage a cam surface 55, carried by the lever 46. A tension spring 56 urges the lever 52 in a clockwise direction, as viewed in Fig. 2, and tends to move the rack 48 downwards thereby to normally maintain the lens focus at infinity. Hence, rotation of finger lever 41 in a counterclockwise direction will cause a downward movement of lever arm 54 and thus will force the rack 48 upwardly against the force of the spring 56 to reduce the focus of the lens. Preferably, a notch 57 is provided in the cam surface 55 corresponding to a predetermined lens focus, such as for example 5 feet, so that the user can feel, when moving the focus lever 41, whether the focus is above or below the distance corresponding to notch 57. A fixed member 58, of generally U-shape, may serve as a stop for the lever arm 54 to prevent damage to the focus barrel mechanism.

The iris adjustment segment gear 27 preferably is provided with stops 60 and 61 secured to the segment gear and adjustable by means of screws as shown. The stops 60 and 61 cooperate with fixed limit switches 62 and 63 respectively to limit rotation of the segment gear 27 and hence adjustment of the iris in a manner to be described hereinafter.

Rotation of the focus lever 41 in a clockwise direction initiates the adjustment or standardizing of the amplifier for the automatic control. The electrical circuit will be described hereinafter, the mechanical arrangement as shown in Figs. 1 and 3, is now to be explained. The lever 46 bears a cam surface 65 extending substantially at right angles with the lever. Hence clockwise rotation of focus lever 41 and of lever 46 eventually causes engagement of cam surface 65 with a roller 66 mounted on a flexible bracket 67 which may be made from a piece of sheet metal fastened by screws 68 to the cover 70 of the camera proper and also to the motor 30, as shown in Fig. 3. The bracket 67 has a slot or cutout 71, shown particularly in Fig. 3, which renders the bracket flexible. The bracket has two main portions 72 and 73 extending substantially at right angles to each other, the portion 73 bearing the roller 66. Hence, rotation of levers 41 and 46 will cause movement of the bracket substantially in the plane of its portion 73. Bracket portion 73 bears a wheel 74 which may have a rubber-covered rim to improve traction and which is normally out of engagement with segment gear 27 but which may be made to engage the segment gear when focus lever 41 is rotated in a clockwise direction. Wheel 74 actuates the movable contact of a potentiometer 75, fixed to bracket portion 73. Furthermore, a switch housing 76 is fixed to bracket portion 72 and has a switch button 77, of a single-pole, double-throw switch, at its lower surface which is normally depressed by a fixed finger 78 secured by a clamp 80 to the motor 30. Hence, when the bracket 67 is moved in the manner described above, switch housing 76 is moved away from finger 78 to relieve the spring-biased switch button 77 which thus permits the single-pole, double throw switch to assume its other position. Both the potentiometer 75 and the switch 76 form part of the electric circuit to be later described.

Adjacent the handle 22 and the focus lever 41 is a control knob 87 for adjusting a rheostat 82 for selecting the speed of the film emulsion as will be more fully described hereinafter. The rheostat 82 is provided with a control shaft 83 having a threaded outer end. The shaft extends through a threaded member 84 threaded through a suitable aperture in the housing 11 and provided with an outer disc sealed to the housing by a rubber gasket or O-ring 85. Two rubber O-rings 86 seal the shaft 83 to the threaded member 84 to provide a water-tight seal between the housing and the shaft. The control knob 87 is secured to the shaft 83 as by a pin 88 and consequently, rotation of the control knob 87 is adapted to adjust the rheostat 82. A fixed stop 90 extends adjacent the control knob 87 from the housing 11 and cooperates with two adjustable stop rings 91 (only one being shown) which has a projecting finger-like portion adapted to cooperate with the fixed stop 90. By means of the locknut 92 threaded on the outer end of shaft 83, the stop rings 91 may be adjusted with respect to the shaft 83 and then locked against the control knob 87. Thus it is possible to adjust the exposure within predetermined limits even when it is too dark to read the markings on the film speed adjustment. It is possible to provide a calibration for the control knob 87 to correlate the emulsion speed with changes in shutter speed or variations in the number of frames per second in the case of a motion picture camera.

As shown in Figs. 4 and 5, two toggle switches 94 and 95 are disposed adjacent the handle 23. Toggle switch 94 permits energization of the electronic lens aperture adjusting circuit while toggle switch 95 energizes the electric motor for advancing film through the camera. The construction of toggle switch 94 is shown in Fig. 5 and includes a toggle lever 93 projecting from a threaded portion 96 of the switch which is threaded through a suitable threaded opening in housing 11. A locknut 97 is threaded over the outwardly projecting portion of member 96 and has an annular groove for a resilient O-ring 98, thus sealing the locknut to the housing. The locknut 97 has an outer annular groove 100 over which an annular projection of a rubber cover or boot 101 is adapted to be disposed and which entirely covers the toggle lever 93. The rubber boot 101 is retained against groove 100 by a ring 102 which is forced over a suitable recess 103 of the rubber boot 101. Thus a watertight seal is provided between the housing and toggle switch 94, toggle switch 95 having the same construction as does switch 94.

As explained hereinbefore, the camera proper is disposed in cover 70 which also houses the camera motor. Cover 70 is supported on a removable shelf 105 (see Figs. 6 and 7) which is slidable in recesses provided by inwardly directed ears 106 on the inner walls of the housing 11. A filament or A battery 107 is disposed on the shelf 105 adjacent the cover 70 while a bias or C battery 108 is disposed on the other side of the shelf 105 as shown in Fig. 1. Two thermionic or electron tubes 110 and 111 are shown in Fig. 1 adjacent the cover 70. A plate or B battery 112 is disposed below the shelf in housing 11 as are two or more power batteries 113. In order to avoid confusion, the leads or cables interconnecting the various electrical elements are not shown in Figs. 1 to 7.

As shown particularly in Figs. 6 and 7, the rear end of the housing 11 is closed by a rear cover 115 fastened to the housing by screws 116 and sealed thereto by a rubber gasket or ring 117 which is disposed in a suitable groove in the rear cover 115. The rear cover 115 has a circular aperture which, in turn, is sealed by a magazine access cover 118 and made water-tight by a resilient O-ring 120 in the rear cover 115. The access cover 118 is provided with an ear 121 in its center having a circular hole through which a flexible rod 122 may slide. The rear cover 115 is provided on opposite ends with slotted ears 123 having detents which are aligned with the hole in ear 121 to permit the rod 122 to be bent and forced through the slots in the ears 123 to press the access cover against the rear cover. Thus the access cover may be readily removed and tightened again to permit access to the interior of the housing and to the camera proper for adjustment thereof.

Referring now to Fig. 9, there is illustrated the electronic control circuit for automatically controlling the aperture of the camera lens. The circuit includes a first electron tube 110 which may be tetrode, as shown, to provide higher gain and having a filament 125, a control grid 126, a screen grid 127 and an anode or plate 128. The second amplifier tube 111 may be a triode having a filament 130, a control grid 131 and an anode 132. Amplifier tubes 110 and 111 may also be replaced by transistors either of the point-contact or of the junction type, as will be obvious. The two filaments of the two tubes are serially connected with the filament or A battery 107 through switch 94b forming a portion of the electronic control switch 94. The connection may be traced from the positive terminal of filament battery 107, switch 94b, lead 133, filament 125, lead 134, filament 130, lead 135 back to the negative terminal of the battery. A lead 136 is connected to lead 134 and to one terminal of a resistor 137 forming part of the adjusting or "standardizing" potentiometer 74. The return connection for the resistor 137 is through lead 138 to the negative terminal of filament battery 107. Hence potentiometer resistor 137 is connected in parallel with filament 130.

The control grid 126 is connected by lead 140 to the movable contact 141 of the switch 76 having two fixed contacts 142 and 143. Normally, the movable contact 141 engages fixed contact 142 until the focus lever 41 is actuated. Fixed contact 142 is connected through lead 144 with photo cell 36 which in turn is connected through leads 145 and 133 to filament 125. The positive terminal of filament battery 107 is also connected through switch 94b, resistors 146, 147 and resistor 148 having a movable contact 150 and forming the rheostat 82 to fixed contact 142. By means of lead 151, the movable contact 152 of standardizing potentiometer 74 is connected to the junction point of resistors 147 and 148.

The negative terminal of the plate or B battery 112 is connected to the negative terminal of the filament battery 107, while the positive terminal of the plate battery is directly connected to the screen grid 127 and through plate load resistor 153 to the plate 128. Furthermore, the positive terminal of the plate battery 112 is connected to plate 132 through a polarized relay 154. The C or bias battery 108 is directly connected between the plate 128 and the grid 131. The polarized relay 154 has two fixed contacts 155 and 156 and a movable contact 157 which may either contact one of its fixed contacts or be in a neutral position. One terminal of the motor 30, which may be a permanent magnet motor, is connected through lead 158 to movable relay contact 157. Fixed relay contact 156 is connected through limit switch 62 and lead 160 to the positive terminal of the power battery 113. The midpoint of the power battery 113 is connected by lead 161 to the other terminal of the motor 30. Similarly, fixed relay contact 155 is connected to the limit switch 63 and through lead 162 to switch 94a, which is the other portion of switch 94, the switch portion 94a being connected to the negative power battery terminal.

The camera motor 163, which advances the film, has one terminal connected by lead 164 to the positive terminal of power battery 113. The negative terminal of power battery 113 is connected to the other terminal of camera motor 163 through switch portion 94a, lead 165, and motor switch 95. Hence, the camera motor 163 can only be energized when the electronic control switch 94 and the motor switch 95 are both closed. This will prevent operation of the camera unless the electronic control circuit is energized which will automatically adjust the camera aperture in a manner which will now be described.

Let it be assumed that switch 76 is in the position shown in Fig. 9, while switches 94a and 94b are closed by actuating the handle 93. When the grid voltage of amplifier tube 110 has a certain value with respect to its filament, the plate current of the tube 111 is such that contact 157 of the relay engages neither fixed contact 155 nor fixed contact 156. Motor 30, therefore, is deenergized. Assume now that the light intensity or brightness of the scene to be photographed is increased. This will cause a decrease of the resistance of cell 36 which will reduce the negative voltage between control grid 126 and filament 125 permitting a larger plate current to flow in tube 110. The resulting increased voltage drop across the plate load resistor 153 causes the voltage of control grid 131 to go in a negative direction which causes a reduction of the plate current of tube 111 which also flows through relay 154. This will cause movable contact 157 to engage fixed contact 155, as illustrated, and hence, motor 30 is energized through a circuit from the negative terminal of power battery 113, switches 94a and 63, fixed contact 155, movable contact 157, and lead 158 to motor 30, and back through lead 161 to the midpoint of the battery. Accordingly, the motor will rotate in a direction to close the iris of the camera lens while the disc 33 will be rotated in a counter-clockwise direction, as viewed in Fig. 8, to reduce the amount of light impinging on cell 36. This operation will continue until the resistance of cell 36 has increased, due to the reduced amount of light which reaches the cell, until the electronic circuit is balanced again and motor 30 is deenergized. Accordingly, it will be seen that the automatic control represents a follow-up mechanism which includes the D.C. amplifiers, relay, motor and the cell with its variable aperture controlled by rotation of disc 33.

If the amount of light falling on cell 36 should decrease, the resistance of the cell increases and a similar sequence of events takes place. The plate current of tube 110 will decrease while the plate current of tube 111 will increase resulting in relay contact 157 engaging fixed contact 156. Motor 30 is now energized through a circuit from the midpoint of battery 113 through lead 161, motor 30, lead 158, movable contact 157, fixed contact 156 and switch 62 back to the positive terminal of the battery through lead 160. It will be noted that the direction of current flow through motor 30 is now reversed so that the motor rotates in the opposite direction to cause opening of the iris mechanism of the camera lens and of the aperture 35 of the cell 36 until equilibrium is restored.

When the iris mechanism of the lens has reached its predetermined limit of travel during closing of the iris, limit switch 63 opens which interrupts the current supply for motor 30 which accordingly stops rotating. This will prevent damage to the iris mechanism. On the other hand, when the iris is being opened and the segment gear 27 reaches the limit of its travel in the opposite direction, limit switch 62 opens which again deenergizes the motor 30. At the same time, a bell or buzzer 170 will be energized. One terminal of buzzer 170 is connected through resistor 171 to lead 160 while its other terminal is connected through lead 172 to fixed contact 156. Hence a circuit is closed from the midpoint of battery 113, lead 161, motor 30, lead 158, movable relay contact 157, fixed contact 156, lead 172, buzzer 170, resistor 171 and back through lead 160 to the positive terminal of the battery. As long as switch 62 is closed, which bypasses buzzer 170 and resistor 171, the buzzer cannot be energized due to the low resistance of this shunt path. However, when the switch 62 is opened, the buzzer will give a warning that the lens aperture cannot be opened any more and that any photographs taken under such condition may be underexposed.

During adjustment of the lens aperture, in the manner just described, or after such adjustment, switch 95 may be closed by operation of its handle to energize the camera motor 163 for a desired period of time.

Resistors 146 and 147 are in shunt with the cell 36 and with the portion of resistor 82 between resistor 147 and tap 150 forming the emulsion speed selector. Cell 36 and rheostat 82 form two independent voltage dividers which see a common voltage source, that is, filament 125 and lead 133, and contact 152 on standardizing potentiometer 74. The actual voltage source includes filament 125, lead 133, contact 94b, battery 107, lead 138, resistor 137, lead 136 and back to the filament. Consequently, both the resistance of rheostat 82 and the resistance of cell 36, either together or separately, will influence the grid voltage of tube 110. The resistance of resistors 146, 147, 148 and of the cell 36 are very high compared with that of resistor 137. Hence, any change of the resistance of each individual resistor will have no appreciable effect on the voltage source. As a result, selection of the film emulsion speed by adjustment of adjustable contact 150 will modify the aperture for any scene brightness. It has been previously explained that control knob 87 may be rotated between fixed limits by adjustment of adjustable stops 91. This makes it possible to increase or decrease the selected film emulsion speed and the resulting exposure by adjustment of knob 87 which has the effect of "fading-out" or "fading-in" the scene. The adjustable stops make it possible to effect these adjustments in the dark or in such other situations where visual adjustment is impractical.

As explained hereinbefore, D.C. amplifiers are inherently unstable and their gain depends on the applied voltages. Hence, in accordance with the present invention, provision is made to readjust or "standardize" periodically the grid bias voltage. To this end, use is made of filament battery 107 which therefore should have a substantially fixed voltage; battery 107 preferably being a mercury cell. The standardizing operation is initiated by rotating focus lever 41 in the clockwise direction which causes engagement of the rubber covered wheel 74 with the iris segment gear 27 and causes disengagement of fixed finger 78 and switch button 77, permitting the switch to engage fixed contact 143 (Fig. 9). Hence, the control grid 126 is now connected through lead 140, contacts 141, 143, resistor 147, lead 151, movable contact 152, a portion of resistor 137, lead 138, battery 107, switch 94b and lead 133 to the filament 125. Another path to filament 125 may be traced from the control grid through switch 76 and through resistor 146. Since the resistance of photo cell 36 is large compared to that of the paths just traced, the photocell circuit may be considered to be open or effectively disconnected. As a result, the control grid 126 now sees the same voltage source through switch 76 and either through resistor 147 to contact 152 or through resistor 146 to the filament 125.

As long as the voltage of control grid 126 is such that the relay 154 is energized, motor 30 will be running to adjust contact 152 through gear 27 and wheel 74. This will continue until contact 152 has reached a position to render the circuit neutral or balanced by virtue of the correct grid potential of tube 110. Resistors 146, 147, contact 152 and the portion of resistor 137 to the left of its contact may be considered a voltage divider across battery 107 and hence adjustment of contact 152 will vary the voltage applied to grid 126 through contacts 142, 143. Now the focus lever 41 may be released, causing disengagement of wheel 74 and gear 27 and at the same time causing movable contact 141 to engage fixed contact 142. The voltage obtained from movable contact 152 is now impressed on grid 126 through resistor 148, contact 150 and switch 76. Further adjustment of the lens aperture and of that of the cell 36 may now be effected in accordance with the scene brightness in the manner previously described. It will be understood that the standardizing circuit will operate also if cell 36 is of the type which develops a voltage in response to light falling thereon.

There has thus been disclosed a camera, particularly an underwater camera of the motion picture type, which has electronic means for automatically adjusting the lens aperture in accordance with the brightness of a scene to be photographed and in accordance with the film speed. The entire camera mechanism as well as the electronic circuit including its power and voltage sources are enclosed in a water-tight housing. Various controls extend from the housing including a lens focus control combined with the standardizing control. The latter permits automatic readjustment of the amplifier grid bias voltage to take care of variations of the tube characteristics which may be due to ageing and variation of the voltage supplies. This condition and structure makes it possible to use D.C. amplifiers with a resulting savings in space and weight. The grid adjustment is effected automatically and makes use of the motor utilized for adjusting the camera lens aperture.

Having thus described the invention and the present embodiment thereof, it is desired to emphasize the fact that many modifications may be resorted to in a manner limited only by a just interpretation of the following claims.

We claim:

1. In a portable photographic camera having a lens and an iris diaphragm mechanism therefor; a photoelectric cell associated with said camera and having a resistance representative of the brightness of a scene to be photographed; aperture adjusting apparatus disposed between said cell and said scene; an electric motor for adjusting in unison said mechanism and said apparatus to control the amount of light permitted to reach said cell;

a source of power for said motor; relay means for controlling the direction of rotation of said motor; a control circuit for said relay means and motor including a first and a second electron tube, each having a filament, a control grid and an anode; a first source of voltage connected in series with said filaments; a second source of voltage connected between the anode of said first tube and the control grid of said second tube; a third source of voltage connected between one of said filaments and said relay means and in series with the anode of said second tube; said cell being serially connected between the control grid and the filament of said first tube; a resistor having a resistance adjustable in accordance with film speed and connected in series with said cell and the filament of said first tube; and voltage divider means connected across one of said filaments, the combination of: means for selectively connecting an adjustable point of said voltage divider means to the control grid of said first tube; and means for simultaneously coupling said motor to said voltage divider means for adjusting said point until said control circuit is balanced.

2. In a photographic camera having a lens and a diaphragm mechanism therefor; a photoelectric cell having a resistance which is representative of the brightness of a scene to be photographed; aperture controlling apparatus for said cell; and an electric motor for simultaneously adjusting said mechanism to vary the light intensity passing through said lens and mechanism and for adjusting said apparatus to vary the resistance of said cell, the combination of: a direct current amplifier for controlling said motor and having a grid control circuit; means including a source of voltage for normally applying a predetermined bias voltage to said grid circuit; means including said cell for varying said bias voltage in response to variations of the brightness of the scene; and manually operable means for selectively coupling said means for applying to said motor for readjusting said predetermined bias voltage until said amplifier and motor are balanced again.

3. In a portable photographic camera having a lens and an iris diaphragm mechanism therefor; a photoelectric cell associated with said camera and having a resistance proportional to the brightness of a scene to be photographed through said lens; aperture adjusting apparatus for said cell; and an electric motor for simultaneously adjusting said mechanism in said apparatus in response to variations of the resistance of said cell, the combination of: a direct current amplifier for energizing said motor until said mechanism and said apparatus are adjusted to permit a predetermined amount of light to pass through said mechanism and to adjust the resistance of said cell to balance said amplifier, said amplifier having a control circuit including said cell, a source of voltage, means for deriving a portion of said voltage, switch means for selectively impressing said portion of said voltage directly on said control circuit, and means operable in unison with said switch means for coupling said means for deriving to said motor for adjusting said voltage portion to balance said amplifier until said motor is deenergized.

4. In a portable photographic camera having a lens and an iris diaphragm mechanism therefor; a photoelectric cell associated with said camera and having a resistance proportional to the brightness of a scene to be photographed through said lens; aperture adjusting apparatus for said cell; an electric motor for simultaneously adjusting said mechanism and said apparatus in response to variations of the resistance of said cell; a direct current amplifier for energizing said motor until said mechanism is adjusted to permit a predetermined amount of light to pass through said mechanism and until said apparatus is adjusted to vary the resistance of said cell to balance said amplifier, said amplifier having an output circuit coupled to said motor, said amplifier having a control circuit, said cell being serially connected in said control circuit, a source of voltage for energizing said amplifier, potentiometer means connected across at least a portion of said source and having a variable tap, and resistive impedance means including a resistor variable in accordance with film speed, said resistive impedance means being connected across said cell, said potentiometer means and variable tap being connected across a predetermined portion of said resistive impedance means, the combination of: switch means selectively operable for connecting a portion of said resistive impedance means and said potentiometer means and tap into said control circuit and across said cell and resistor, and means operable in unison with said switch means for coupling said tap to said motor to adjust the voltage applied to said control circuit.

5. In a portable photographic camera having a lens and an iris diaphragm thereof; a photoelectric cell associated with said camera and having a resistance proportional to the brightness of a scene to be photographed through said lens; aperture adjusting apparatus for said cell; an electric motor for simultaneously adjusting said mechanism and said apparatus in response to variations of the resistance of said cell; a direct current amplifier having a control grid and filament for energizing said motor until said mechanism is adjusted to permit a predetermined amount of light to pass through said mechanism and until said apparatus is adjusted to vary the resistance of said cell to balance said amplifier, said amplifier having an output circuit coupled to said motor, said cell being serially connected with said control grid and filament, a source of voltage for energizing the filament of said amplifier, potentiometer means connected across at least a portion of said source, and having a variable tap, and a first resistor and a second resistor variable in accordance with film speed, said resistors being connected across said cell, said potentiometer means and variable tap being connected across said first resistor, the combination of: switch means selectively operable for connecting a portion of said first resistor and said potentiometer means and tap across said cell and second resistor and the remaining portion of said first resistor, and means operable in unison with said switch means for coupling said tap to said motor to adjust the voltage applied between said control grid and filament.

6. In a portable photographic camera having a lens and an iris diaphragm mechanism therefor; a photoelectric cell associated with said camera and having a resistance proportional to the brightness of a scene to be photographed through said lens; aperture adjusting apparatus for said cell; an electric motor for simultaneously adjusting said mechanism and said apparatus in response to variations of the resistance of said cell; a direct current amplifier having a control grid and filament for energizing said motor until said mechanism is adjusted to permit a predetermined amount of light to pass through said mechanism and until said apparatus is adjusted to vary the resistance of said cell to balance said amplifier, said amplifier having an output circuit coupled to said motor, said cell being directly connected between said control grid and filament, a source of voltage for energizing the filament of said amplifier, a potentiometer connected across at least a portion of said source and having a variable tap, a first, and a second and a third resistor, said third resistor being variable in accordance with film speed, said resistors being connected across said cell, said variable tap being connected between the junction point of said second and third resistors, the combination of: switch means selectively operable for disconnecting the junction point of said cell and third resistor from said control grid and for connecting instead the junction point of said first and second resistors to said control grid, and means operable in unison with said switch means to adjust the voltage applied between said control grid and filament.

7. In an automatic camera control for an underwater camera enclosed in a case and sealed against entry of water and adapted for operation without visual aid, the camera control including a photocell and a photocell network, a direct coupled amplifier, an iris adjusting mechanism and a follow-up motor, the combination of: a lever disposed through and extending outside said case; a wheel rotatably disposed adjacent said iris adjusting mechanism and adapted to be positioned by said lever, said wheel being selectively mechanically coupled to said follow-up motor for rotation thereby; a switch disposed adjacent said wheel and operable by movement of said lever, said switch being electrically coupled to said amplifier and said photocell network for selectively disconnecting said amplifier from said photocell; a potentiometer disposed adjacent said wheel and electrically coupled to said photocell network and said amplifier and mechanically coupled to said wheel for rotation thereby, said potentiometer being operable to adjust the bias of said amplifier, whereby, upon operation of said lever, to actuate said switch and mechanically to couple said wheel with said follow-up motor, thereby providing automatic bias adjustment of said amplifier.

8. In an automatic camera control for an underwater camera enclosed in a case and sealed against the entry of water and adapted for operation without visual aid, the camera control including a photocell, an iris, an iris-adjusting mechanism and a follow-up motor, the combination of: a first limit switch disposed adjacent said iris-adjusting mechanism, said iris-adjusting mechanism being arranged to actuate said first limit switch when said iris is fully closed; a second limit switch disposed adjacent said iris-adjusting mechanism, said iris-adjusting mechanism being arranged to actuate said second limit switch when said iris is fully open, said first and second limit switches being electrically coupled in series with said follow-up motor; and a buzzer electrically coupled to said second limit switch, whereby, when said iris is fully closed, said first limit switch renders said follow-up motor inoperative, and, when said iris is fully opened, said second limit switch renders said follow-up motor inoperative and said buzzer operative.

9. In an automatic camera control for an underwater camera having an iris adjusting mechanism including a photocell, a direct-coupled amplifier and a follow-up motor, the combination of: first and second limit switches positioned adjacent said mechanism and arranged to be actuated thereby, said limit switches being electrically coupled to said follow-up motor; a buzzer electrically coupled to said second limit switch; a source of bias potential for said amplifier; a potentiometer coupled to said source; means for rendering said amplifier insensitive to said photocell while simultaneously mechanically coupling said potentiometer to said mechanism; and means having adjustable limit stops coupled to said amplifier for selectively operating said iris-adjusting mechanism.

References Cited in the file of this patent

UNITED STATES PATENTS

| | | |
|---|---|---|
| 1,859,930 | Miller | May 24, 1932 |
| 1,969,518 | Moles | Aug. 7, 1934 |
| 1,970,103 | Runaldue | Aug. 14, 1934 |
| 1,974,433 | Riszdorfer | Sept. 24, 1934 |
| 2,099,349 | Rosebury | Nov. 16, 1937 |
| 2,133,882 | Zworykin | Oct. 18, 1938 |
| 2,245,124 | Bonn | June 10, 1941 |
| 2,251,473 | Touceda | Aug. 5, 1941 |
| 2,421,476 | Belar et al. | June 3, 1947 |
| 2,487,868 | Grigsby | Nov. 15, 1949 |
| 2,573,885 | Whitman et al. | Nov. 6, 1951 |
| 2,655,848 | Gray | Oct. 20, 1953 |
| 2,683,402 | Bruck | July 13, 1954 |

FOREIGN PATENTS

| | | |
|---|---|---|
| 429,676 | Great Britain | June 5, 1935 |
| 491,410 | Great Britain | Sept. 1, 1938 |
| 821,026 | France | Nov. 25, 1937 |